(12) United States Patent
Su

(10) Patent No.: US 12,745,011 B2
(45) Date of Patent: Sep. 22, 2026

(54) AUTO FLICKER DETECTOR

(71) Applicant: Himax Imaging Limited, Tainan City (TW)

(72) Inventor: Felix Su, Tainan City (TW)

(73) Assignee: Himax Imaging Limited, Tainan City (TW)

( * ) Notice: Subject to any disclaimer, the term of this patent is extended or adjusted under 35 U.S.C. 154(b) by 92 days.

(21) Appl. No.: 18/945,378

(22) Filed: Nov. 12, 2024

(65) Prior Publication Data

US 2026/0136107 A1 May 14, 2026

(51) Int. Cl.
*H04N 23/745* (2023.01)

(52) U.S. Cl.
CPC .................................. *H04N 23/745* (2023.01)

(58) Field of Classification Search
CPC ............................. H04N 23/745; H04N 23/75
See application file for complete search history.

(56) References Cited

U.S. PATENT DOCUMENTS 6,501,518 B2 * 12/2002 Smith .................... H04N 23/70 348/E5.034
7,248,289 B2 * 7/2007 Katoh .................... H04N 23/70 348/E5.034
7,538,799 B2 * 5/2009 Yanof .................... H04N 23/71 348/226.1
8,330,829 B2 * 12/2012 Goh ..................... H04N 23/745 348/226.1
8,711,245 B2 * 4/2014 Kinrot .................. H04N 23/745 348/241
8,743,240 B2 * 6/2014 Horiuchi .............. H04N 7/0127 348/222.1
9,232,148 B2 * 1/2016 Sugie ..................... H04N 23/70
11,843,872 B2 * 12/2023 Kobayashi ........... H04N 23/745
12,231,780 B2 * 2/2025 Le ......................... G06V 10/772
2003/0081138 A1 * 5/2003 Hofer ..................... H04N 23/70 348/E5.034
2003/0112343 A1 * 6/2003 Katoh .................. H04N 23/745 348/226.1
2004/0201729 A1 * 10/2004 Poplin .................... H04N 23/70 348/226.1
2006/0158531 A1 * 7/2006 Yanof .................... H04N 23/71 348/226.1
2011/0157415 A1 * 6/2011 Goh ..................... H04N 23/745 348/226.1
2011/0181753 A1 * 7/2011 Sugie ..................... H04N 23/69 348/226.1
2012/0154629 A1 * 6/2012 Horiuchi .............. H04N 7/0127 348/226.1
2015/0281546 A1 * 10/2015 Okada .................. H04N 23/745 348/226.1

(Continued)

*Primary Examiner* — Sinh Tran
*Assistant Examiner* — Mehedi Hassan
(74) *Attorney, Agent, or Firm* — Donald E. Stout; Stout, Uxa & Buyan, LLP

(57) ABSTRACT

An auto flicker detector (AFD) includes a difference generator that generates a difference image representing difference between consecutive frames of at least one pair of captured images from an image sensor illuminated by a light source; and a correlator operatively performed on the difference image to generate correlations associated with a first frequency and a second frequency respectively. A frequency at which the light source flickers is determined according to the correlations.

17 Claims, 5 Drawing Sheets

(56) References Cited

U.S. PATENT DOCUMENTS

2017/0134634 A1* 5/2017 Jin .......................... H04N 23/73
2023/0254591 A1* 8/2023 Le ........................ H04N 23/745
348/226.1
2024/0056692 A1* 2/2024 Lebrun .................. H04N 23/71
2024/0406553 A1* 12/2024 Kikuchi ............... H04N 23/672
2025/0071431 A1* 2/2025 Terasawa ............. H04N 23/745

* cited by examiner 100
11
13
Rolling shutter
12
Image sensor
captured image
14
AFD 14
captured image
141
Extractor
luma image
142
Difference generator
luma difference image
143
Correlator
correlation@50Hz
correlation@60Hz
144
Comparator
@50Hz/60Hz

AUTO FLICKER DETECTOR

BACKGROUND OF THE INVENTION

1. Field of the Invention

The present invention generally relates to an imaging system, and more particularly to an auto flicker detector (AFD) adaptable to the imaging system.

2. Description of Related Art

A shutter in an image sensor controls the exposure time, which is the duration that the image sensor is exposed to light. There are two main types of shutters used in image sensors: global shutters and rolling shutters. Global shutter captures the entire image at once by exposing all pixels simultaneously.

Rolling shutter is a scheme of image capture in which a still picture (in a still camera) or each frame of a video (in a video camera) is captured not by taking a snapshot of the entire scene at a single instant in time but rather by scanning across the scene rapidly, vertically, horizontally or rotationally. In other words, not all parts of the image of the scene are recorded at exactly the same instant. This is in contrast with global shutter in which the entire frame is captured at the same instant. The rolling shutter can be either mechanical or electronic.

Flicker artifacts in rolling shutter image sensors occur due to the sequential exposure of rows of pixels. This can cause issues when capturing scenes illuminated by flickering light sources, such as fluorescent lights or incandescent lights, which often flicker at a frequency that can interfere with the sensor's readout process.

Many artificial light sources flicker at a frequency (e.g., 50 Hz or 60 Hz) related to the power supply or mains electricity. If the rolling shutter readout speed is not synchronized with this flicker, it can result in varying brightness levels across the image. Since each row of pixels is exposed at a slightly different time, any changes in illumination during the readout process can cause bands of varying brightness or color across the image, which are visible, perceptible and not desirable by human observer's vision.

For the foregoing reasons, a need has arisen to propose a novel scheme to overcome the drawbacks of conventional rolling shutters in image sensors.

SUMMARY OF THE INVENTION

In view of the foregoing, it is an object of the embodiment of the present invention to provide an imaging system with an auto flicker detector (AFD) capable of detecting a frequency at which the light source flickers due to the AC power supply.

According to one embodiment, an auto flicker detector (AFD) includes a difference generator and a correlator. The difference generator generates a difference image representing difference between consecutive frames of at least one pair of captured images from an image sensor illuminated by a light source. The correlator is operatively performed on the difference image to generate correlations associated with a first frequency and a second frequency respectively. A frequency at which the light source flickers is determined according to the correlations.

DETAILED DESCRIPTION OF THE INVENTION

Figures 1, 2:
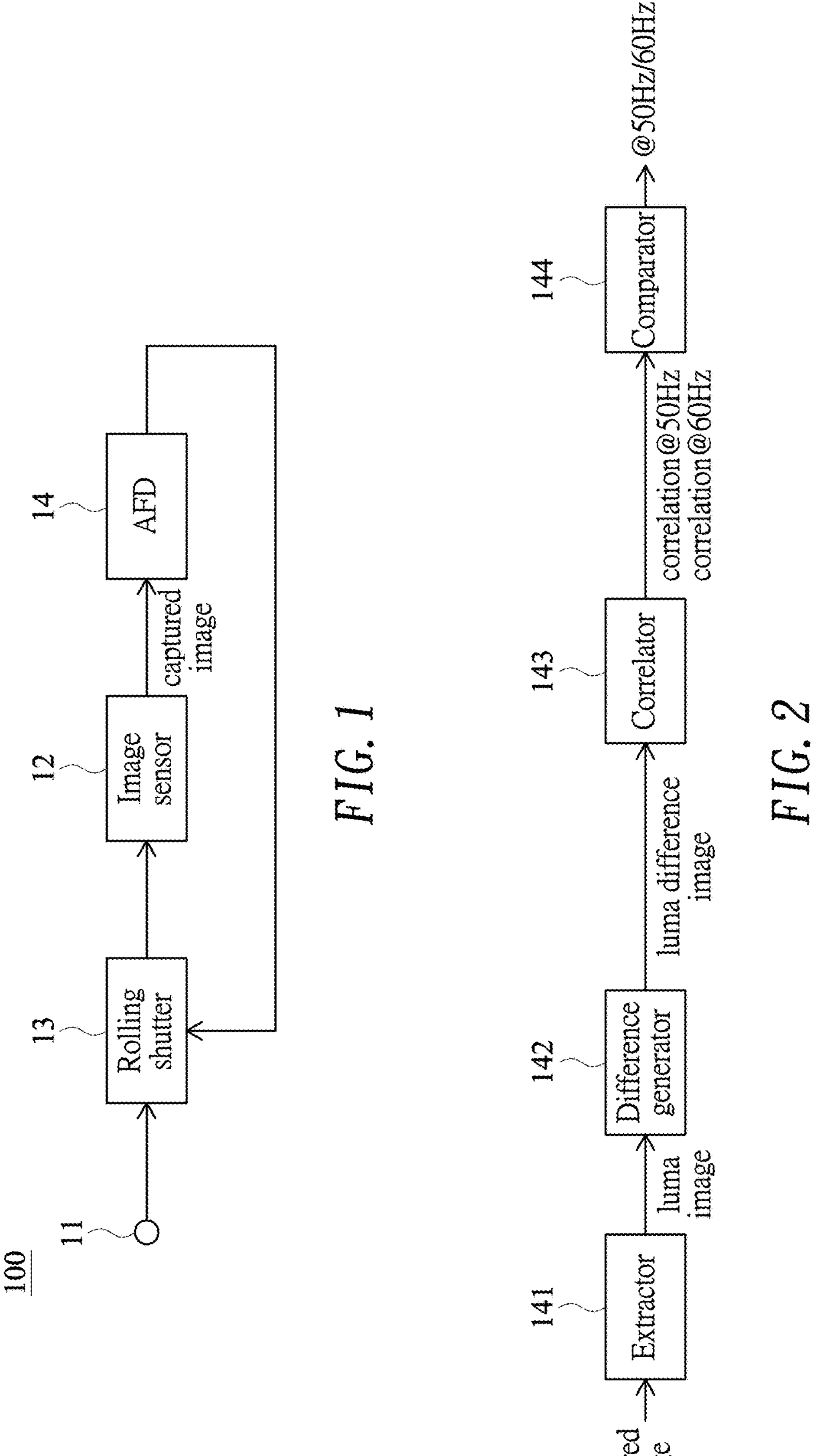
FIG. 1 shows a block diagram illustrating an imaging system according to one embodiment of the present invention.
FIG. 2 shows a detailed block diagram of the auto flicker detector (AFD) adaptable to the imaging system of FIG. 1 according to one embodiment of the present invention.

FIG. 1 shows a block diagram illustrating an imaging system 100 according to one embodiment of the present invention.

Specifically, the imaging system 100 of the embodiment may include an (artificial) light source 11, such as a fluorescent light or incandescent light, connected to an alternating current (AC) power supply (not shown), such as mains electricity, which typically operates at a first frequency (e.g., 50 Hz) or a second frequency (e.g., 60 Hz) depending on the region. Therefore, the light source 11 flickers at a frequency related to the AC power supply.

The imaging system 100 may include an image sensor 12 (e.g., complementary metal-oxide-semiconductor or CMOS image sensor) coupled to receive light emitted from the light source 11 via a rolling shutter 13 and configured to convert the emitted light into electrical signals, thereby generating a captured image. The rolling shutter 13 for the image sensor 12 controls exposure time, which is a duration that the image sensor 13 is exposed to the emitted light (from the light source 11). According to the rolling shutter 13, the image sensor 12 captures the image by horizontally, for example, scanning across a scene, exposing and reading out each row of pixels sequentially.

The imaging system 100 may include an auto flicker detector (AFD) 14 configured to determine a frequency at which the light source 11 flickers due to the AC power supply, according to the captured image (from the image sensor 12). The determined frequency at which the light source 11 flickers may then be fed back to control the rolling shutter 13 in order to reduce or eliminate the flicker artifacts.

FIG. 2 shows a detailed block diagram of the auto flicker detector (AFD) 14 adaptable to the imaging system 100 of FIG. 1 according to one embodiment of the present invention. Specifically, the AFD 14 of the embodiment may include an extractor 141 configured to extract a luma (or brightness) image from the captured image. For example, the extractor 141 may convert the captured image from RGB to YUV color space, where Y component represents the luma image.

The AFD 14 of the embodiment may include a difference generator 142 configured to generate a luma difference image representing difference between consecutive (image) frames of at least one pair, for example, between a luma image in a preceding frame and a luma image in a current frame.

The AFD 14 of the embodiment may include a correlator 143 operatively performing on the luma difference image and accordingly generating correlations associated with the first frequency and the second frequency (e.g., 50 Hz and 60 Hz) respectively. Specifically, domain transformation, such as discrete Fourier transform (DFT), is first performed to transform the luma difference image from time domain to frequency domain. Next, transformed components (from the domain transformation) corresponding to 100 Hz (which is twice 50 Hz or the first frequency) and 120 Hz (which is twice 60 Hz or the second frequency) are used as correlations associated with 50 Hz and 60 Hz respectively. If the correlation associated with 50 Hz is statistically greater than the correlation associated with 60 Hz, it means that the light source 11 flickers at 50 Hz, otherwise the light source 11 flickers at 60 Hz.

In the embodiment, transformed component (i.e., DFT coefficients) R_100 corresponding to 100 Hz and transformed component R_120 corresponding to 120 Hz may be calculated as follows:

$$\text{K\_100} = 100 * \text{T\_readout};$$

$$\text{K\_120} = 120 * \text{T\_readout};$$

$$\text{Rr\_100} = \sum_{i=1}^{rows} C(i) * \cos(2 * pi * i * \text{K\_100})$$

$$\text{Ri\_100} = \sum_{i=1}^{rows} C(i) * \sin(2 * pi * i * \text{K\_100})$$

$$\text{R\_100} = \text{Rr\_100}\hat{}2 + \text{Ri\_100}\hat{}2$$

$$\text{Rr\_120} = \sum_{i=1}^{rows} C(i) * \cos(2 * pi * i * \text{K\_120})$$

$$\text{Ri\_120} = \sum_{i=1}^{rows} C(i) * \sin(2 * pi * i * \text{K\_120})$$

$$\text{R\_120} = \text{Rr\_120}\hat{}2 + \text{Ri\_120}\hat{}2$$

where R_100 represents one dimension DFT coefficient on 100 Hz (which is twice 50 Hz), R_120 represents one dimension DFT coefficient on 120 Hz (which is twice 60 Hz), pi is a mathematical constant that is approximately equal to 3.14159, and T_readout represents readout time for the image sensor 12 to read out one row.

The AFD 14 of the embodiment may include a comparator 144 configured to compare the correlation associated with 50 Hz and the correlation associated with 60 Hz for consecutive frames (of a pair). If the correlation associated with 50 Hz is greater than the correlation associated with 60 Hz, it means that the light source 11 flickers at 50 Hz, otherwise the light source 11 flickers at 60 Hz. In the embodiment, the AFD 14 is coupled to receive and configured to perform on plural pairs of consecutive frames.

Figure 3:
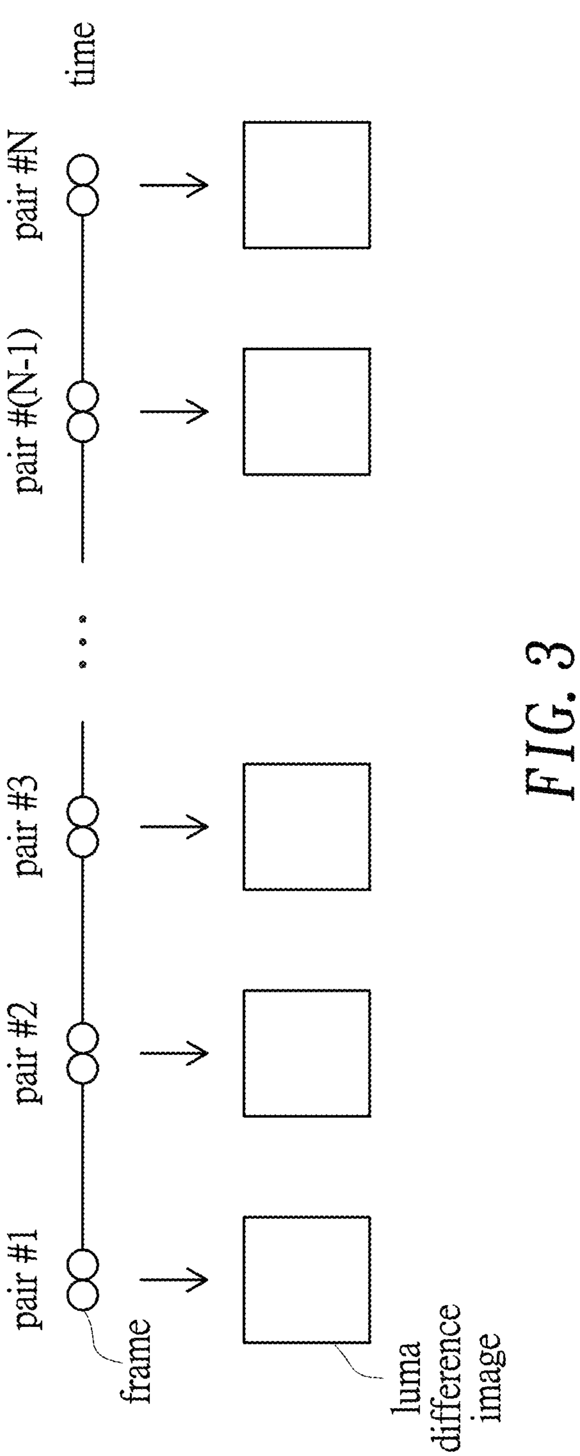
FIG. 3 schematically shows N pairs of consecutive frames and corresponding luma difference images.

FIG. 3 schematically shows N pairs of consecutive frames (as represented by circles) and corresponding luma difference images. For each pair of consecutive frames, only a (dominated) correlation with larger value is accumulatively counted (by the comparator 144), thereby obtaining final counts of the correlations associated with 50 Hz and 60 Hz respectively. In one exemplary embodiment, if the final count of the correlations associated with 50 Hz is greater than the final count of the correlations associated with 60 Hz, 50 Hz is the dominated flicker frequency and the light source 11 is determined to be flickering at 50 Hz; otherwise 60 Hz is the dominated flicker frequency and the light source 11 is determined to be flickering at 60 Hz. In another exemplary embodiment, if the final count of the correlations associated with 50 Hz is greater than the final count of the correlations associated with 60 Hz and is greater than a predetermined threshold, 50 Hz is the dominated flicker frequency and the light source 11 is determined to be flickering at 50 Hz. On the contrary, if the final count of the correlations associated with 60 Hz is greater than the final count of the correlations associated with 50 Hz and is greater than the predetermined threshold, 60 Hz is the dominated flicker frequency and the light source 11 is determined to be flickering at 60 Hz.

Figure 4A:
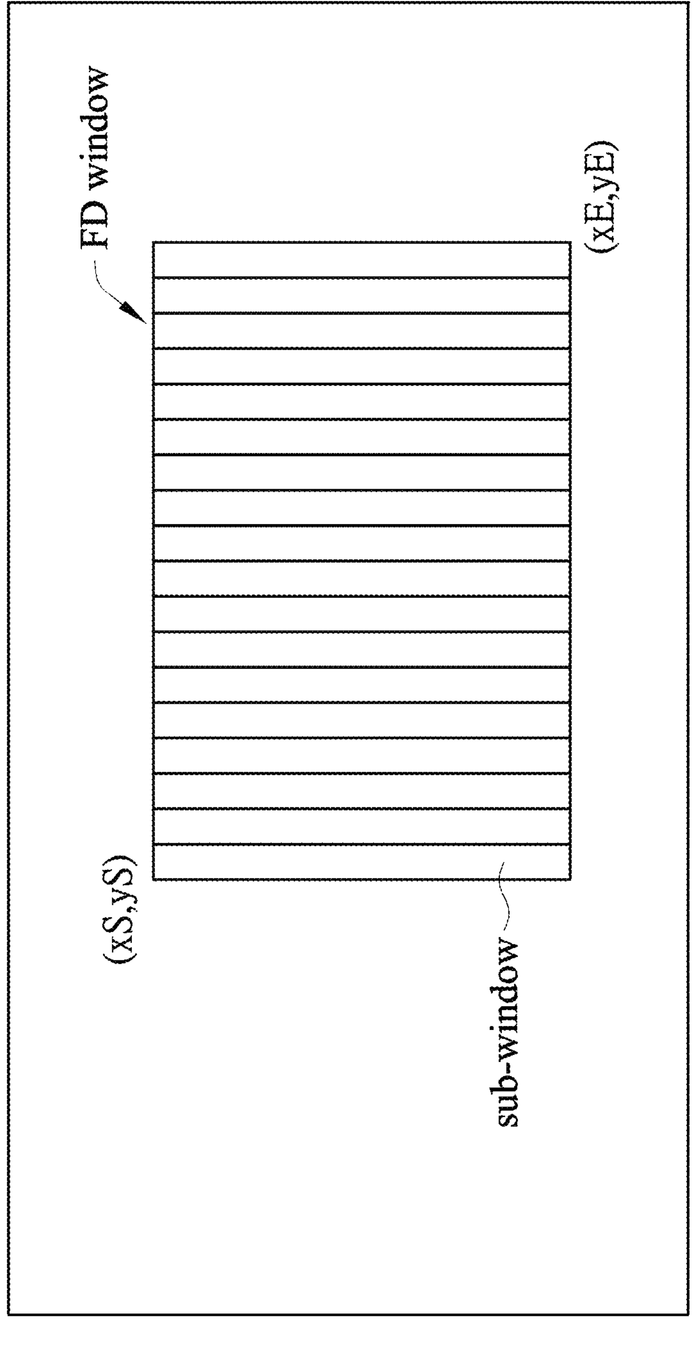
FIG. 4A to FIG. 4E show schematic diagrams illustrating how the correlator of FIG. 2 generates the correlations according to one embodiment of the present invention.
Figure 4B:
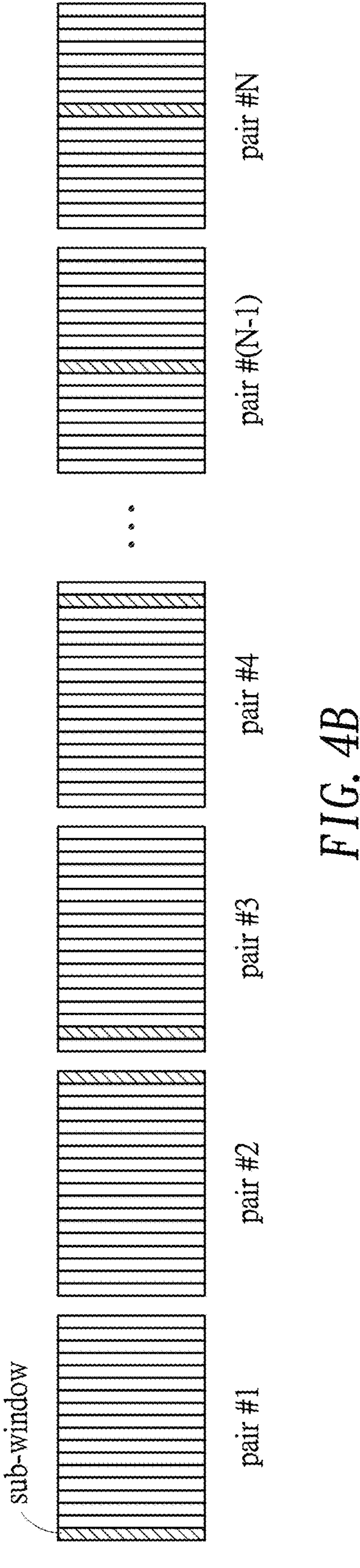

FIG. 4A to FIG. 4E show schematic diagrams illustrating how the correlator 143 of FIG. 2 generates the correlations according to one embodiment of the present invention. FIG. 4A shows an (image) frame (e.g., 1280×960 pixels), in which a flicker detection (FD) window is defined as an area between a start (upper-left) point (xS, yS) and an end point (lower-right) point (xE, yE). It is noted that the FD window may cover either entire of the frame or part of the frame as exemplified in FIG. 4A. In one embodiment, the FD window may be divided into N sub-windows (also called pan Windows in the embodiment), each containing cN columns (cN is preferably divisible by 2), where N=(xE−xS+1)/cN. The height of the FD window is a fixed value (for example, 480=(yE−yS+1)).

Figure 4C:
Figure 4C:
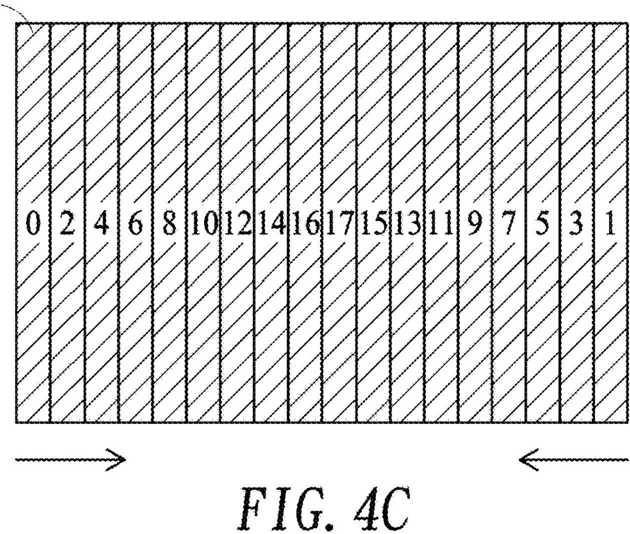
Figure 4D:
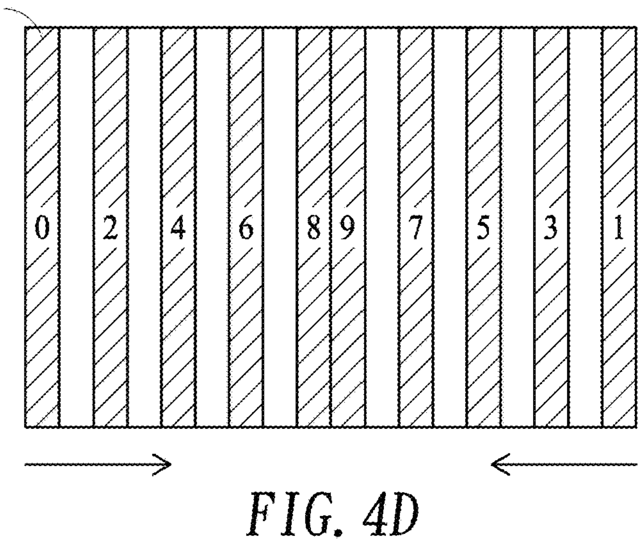
Figure 4E:
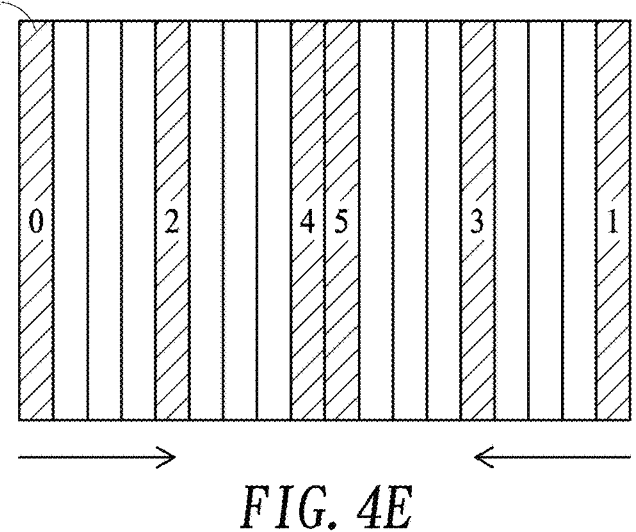

For each pair of consecutive frames, corresponding sub-windows are used to generate a luma difference image, according to which correlations associated with 50 Hz and 60 Hz are generated respectively. Sub-windows are moved (or panned) through entire or part of the FD window. As exemplified in FIG. 4B, leftmost sub-windows (or pan Windows) are used for the first pair of consecutive frames, rightmost sub-windows are used for the second pair of consecutive frames, the second sub-windows on the left are used for the third pair of consecutive frames, and the second sub-windows on the right are used for the fourth pair of consecutive frames. Generally speaking, sub-windows are moved evenly within the FD window. For example, sub-windows are alternatively moved from both ends toward center until entire frame is covered as shown in FIG. 4C (or alternatively moved from center toward both ends), where numbers represent the sequence number of corresponding pair of consecutive frames. In another embodiment as shown in FIG. 4D, one sub-window is skipped each time when sub-windows are alternatively moved toward center. In a further embodiment as shown in FIG. 4E, three sub-windows are skipped each time when sub-windows are alternatively moved toward center.

According to the embodiment as described above, the flicker artifacts caused by the light source flickers due to the AC power supply can be effectively suppressed in a short period of time with minimum memory utilization. The embodiment provides better accuracy in detection and correction with minimum impact on image sensor speed for implementation with limited memory resource.

Although specific embodiments have been illustrated and described, it will be appreciated by those skilled in the art that various modifications may be made without departing from the scope of the present invention, which is intended to be limited solely by the appended claims.

What is claimed is:

1. An auto flicker detector (AFD), comprising:

a difference generator that generates a difference image representing difference between consecutive frames of at least one pair of captured images from an image sensor illuminated by a light source; and a correlator operatively performed on the difference image to generate correlations associated with a first frequency and a second frequency respectively;

wherein a frequency at which the light source flickers is determined by comparing a correlation associated with the first frequency and a correlation associated with the second frequency; and wherein the determined frequency is used by an imaging system to adjust a rolling-shutter readout parameter to reduce flicker artifacts.

2. The AFD of claim 1, further comprising:

an extractor that extracts a luma image for each of the captured images before generating the difference image.

3. The AFD of claim 2, wherein the extractor converts the captured images from RGB to YUV color space, where Y component represents the luma image.

4. The AFD of claim 1, wherein the image sensor converts light emitted from the light source via a rolling shutter into electrical signals, thereby generating the captured images.

5. The AFD of claim 1, wherein the light source flickers at the first frequency if the correlation associated with the first frequency is statistically greater than the correlation associated with the second frequency.

6. The AFD of claim 1, wherein the correlator transforms the difference image from time domain to frequency domain by domain transformation, and transformed components of multiples of the first frequency and the second frequency are used as the correlations associated with the first frequency and the second frequency respectively.

7. The AFD of claim 6, wherein the domain transformation comprises discrete Fourier transform (DFT).

8. The AFD of claim 1, further comprising:

a comparator that compares the correlation associated with the first frequency and the correlation associated with the second frequency for consecutive frames of a pair.

9. The AFD of claim 8, wherein the difference generator receives and performs on plural pairs of consecutive frames.

10. The AFD of claim 9, wherein only a correlation with larger value is accumulatively counted by the comparator, thereby obtaining final counts of the correlations associated with the first frequency and the second frequency respectively.

11. The AFD of claim 10, wherein the light source is determined to be flickering at the first frequency when the final count of the correlations associated with the first frequency is greater than the final count of the correlations associated with the second frequency; and the light source is determined to be flickering at the second frequency when the final count of the correlations associated with the second frequency is greater than the final count of the correlations associated with the first frequency.

12. The AFD of claim 10, wherein the light source is determined to be flickering at the first frequency when the final count of the correlations associated with the first frequency is greater than the final count of the correlations associated with the second frequency and is greater than a predetermined threshold; and the light source is determined to be flickering at the second frequency when the final count of the correlations associated with the second frequency is greater than the final count of the correlations associated with the first frequency and is greater than the predetermined threshold.

13. The AFD of claim 9, wherein a flicker detection (FD) window is defined in a frame and is performed by the difference generator.

14. The AFD of claim 13, wherein the FD window is divided into plural sub-windows, and corresponding sub-windows are used to generate the difference image for each pair of consecutive frames.

15. The AFD of claim 14, wherein the sub-windows are moved through entire or part of the FD window for generating difference images of the plural pairs of consecutive frames.

16. The AFD of claim 15, wherein the sub-windows are alternatively moved from both ends toward center until entire frame is covered.

17. The AFD of claim 15, wherein one or more sub-windows are skipped each time when the sub-windows are moved.

* * * * *